March 25, 1947.  H. E. SHEETS  2,417,994

VALVE

Filed Sept. 14, 1942

Herman E. Sheets
INVENTOR

BY Robert M. Dunning
ATTORNEY

Patented Mar. 25, 1947

2,417,994

UNITED STATES PATENT OFFICE 2,417,994

VALVE

Herman E. Sheets, St. Paul, Minn., assignor to St. Paul Foundry Company, St. Paul, Minn., a corporation of Minnesota Application September 14, 1942, Serial No. 458,198

3 Claims. (Cl. 137—139)

My invention relates to an improvement in valves, and more specifically in valve combinations in which an ejector or equivalent device is connected to a main valve to facilitate the operation of the same.

Many valves have previously been constructed in which a pilot valve is used to control the operation of a main valve. I have found that by adding to this combination an ejector or equivalent device having its mixing chamber or mixing nozzle in communication with the main valve, the operation thereof may be greatly facilitated and certain results can be attained which have previously been considered impossible.

The object of the present invention lies in the provision of a main valve having associated therewith an ejector device. This ejector is connected in such a manner to the main valve that the main valve may be operated by controlling the pressure in a chamber by said ejector device. As a result the main valve may be caused to operate positively and quickly. Furthermore the ejector renders the main valve more sensitive than would otherwise be possible due to the greater variation in pressure controlling the main valve.

The particular design of ejector device used depends largely upon the characteristics of the type of fluid with which the valve is to be used. The Reynolds number of the fluid provides the best gauge for determining how efficient the ejector must be. Under similar conditions of pressure, size, and temperature, the fluid with a low viscosity and within the range of high Reynolds numbers, such as a gas, will require only a relatively inefficient ejector to produce the necessary pressure difference in the pressure chamber of the valve. Under the same conditions, a fluid with a lower Reynolds number, such as a liquid, will require an ejector of higher efficiency.

An ejector or equivalent device is understood to perform a certain energy transformation. The fluid entering the ejector device may have a certain pressure energy and velocity energy at the inlet. At an intermediate location in the ejector device a part of the initial pressure energy is converted into velocity energy with a certain efficiency of energy transformation. There exists at the intermediate location in the ejector device a lower pressure than at the inlet and a higher velocity due to the energy transformation. Downstream of the above location another energy transformation may take place so as to convert the velocity energy back into pressure energy.

This energy transformation may be performed with a certain other efficiency. At the location where the low pressure exists there is a port so that fluid can be entrained in the ejector device if it is desired to do so. It is evident that a device of the above described type has a certain high pressure at the inlet and generates a certain lower pressure at a location between the inlet and the outlet. It may also generate a third different pressure at the outlet in the event an energy transformation is applied downstream of the lower pressure location. This third pressure will be close to the lower pressure when the above mentioned energy transformation is of low efficiency, and/or a large amount of fluid is entrained; and it can be of a pressure close to the inlet pressure when the above mentioned energy transformation is of high efficiency and a small amount of fluid is entrained.

It is an object of the present invention to combine a main valve controlled by an ejector with a pilot valve used to control the flow of fluid through the ejector. For example, if the pilot valve is located in the ejector outlet a wide variation of pressures may result in the valve pressure chamber connected to the entraining port. When such a pilot valve is closed, pressure is transmitted from the inlet through the ejector to the entraining port, permitting the valve pressure chamber to be subjected to inlet pressure. However, when this pilot valve is opened, a low pressure will exist in the valve pressure chamber and the entraining port.

A feature of the present invention lies in the provision of a valve which may be controlled by pressure within a pressure chamber. This main valve may either be of the diaphragm type, the piston type, or the bellows type. The pressure chamber controlling the valve is connected to the mixing chamber or mixing nozzle of an ejector so that by passing fluid through the ejector a low pressure or partial vacuum may be created in the mixing space or chamber. As this low pressure or partial vacuum may be communicated to the pressure chamber within the valve, a greater variation in the pressure found in the pressure chamber may be realized.

A further feature of the present invention lies in the combination of a valve having a pressure chamber controlling the same, and an ejector device associated with this pressure chamber in such a manner that the full pressure of fluid passing through the ejector device may be transmitted to the pressure chamber controlling the valve, or a low pressure may be created in this pressure chamber.

A further feature of the present invention lies in controlling the low pressure in the mixing space of the ejector and in the pressure chamber of the valve in such a way that this pressure may be considerably lower than the pressure on the discharge side of the valve.

A further important feature of the present invention lies in the use of a means of creating a low pressure used in conjunction with a main valve. In the past it has commonly been necessary to use the pressure of fluid passing through the main valve to move this main valve to one extreme position. With my construction I may use low pressure to assist movement of the main valve in one direction, and may use the pressure of fluid traveling through the ejector to assist movement of the main valve in the other direction. As a result a positive force is provided to assist movement of the main valve in both its opening and closing movements.

A feature of the present invention lies in the fact that the valves may be reversible in operation if desired. I have found that a pair of identical opposed nozzles may form an ejector capable of operating by a flow of fluid in either direction, if these nozzles are properly spaced and proportioned. This is due to the tendency for the fluid stream to further constrict in diameter after leaving a nozzle, thus permitting the constricted stream of fluid entering the opposed nozzle to entrain fluid from a mixing space between the nozzles.

A further feature of the present invention lies in the provision, if desired, of a valve to regulate the speed of flow of fluid into, or from, the ejector device. By this means the time required to open or to close the main valve may be adjusted.

A further feature of the present invention lies in the provision, if desired, of regulating valve means which may be used to hold the main valve in any desired position. This regulating valve means is capable of holding the main valve in open position, closed position, or any intermediate position.

An added feature of the present invention consists in the fact that the pilot fluid operating in the pressure chamber of the valve is entirely separated from the fluid flowing through the valve. This makes it possible to use one fluid for the pilot system in order to control another fluid in the main valve.

These and other objects and novel features of my invention will be more clearly and fully set forth in the following specification and claims.

In the drawings forming a part of my specification:

Figure 1:
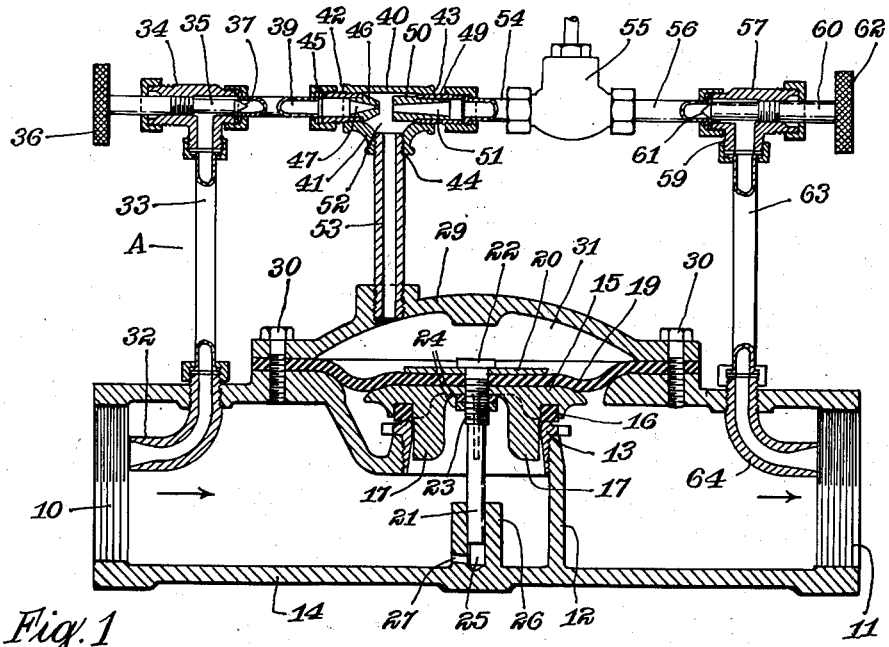
Figure 1 is a longitudinal section through a valve showing an ejector associated therewith to assist the operation thereof.
Figure 2:
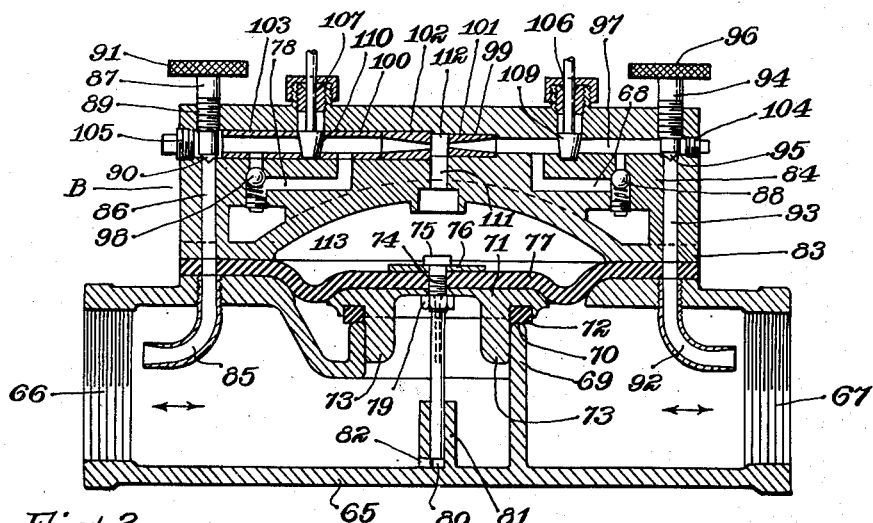
Figure 2 is a sectional view through a slightly different form of construction of valve in which the ejector and control valves are supported integrally with the valve casing.

The valve A illustrated in Figure 1 of the drawings includes an inlet 10 and an outlet 11. A ported partition 12 supporting the valve seat 13 is provided within the valve casing 14 between the inlet and the outlet. The construction is such that the fluid passing through the main valve must pass through the valve seat 13.

A valve member or disc retainer 15 is provided with a disc or ring 16 designed to engage against the valve seat 13. Valve guides 17 are preferably provided to hold the valve member in proper relation to its seat. A diaphragm 19 overlies the valve member 15 and is secured thereto. A diaphragm washer 20 overlies the diaphragm 19 and a valve stem 21 holds these elements in assembled relation. In the construction illustrated a head 22 is provided on the valve stem 21 to engage against the diaphragm washer 20 and the upper portion of the valve stem is threaded at 23 to permit lock nuts 24 to clamp the valve member, diaphragm and diaphragm washer in assembled relation.

The valve stem 21 extends into an opening 25 in a guide or bearing boss 26 on the valve body. A passage 27 is provided through this boss 26 to prevent liquid from being trapped within the opening 25 and making possible proper operation of the stem 21.

The valve cover 29 is connected to the valve body 14 by cap screws 30 or other suitable means. These cap screws may extend through the marginal edges of the diaphragm 19 to clamp the diaphragm marginally between the valve body and its cover. Thus a chamber 31 is provided above the diaphragm 19 which is separated from the fluid within the valve body by the diaphragm.

The elbow element 32 is provided within the valve body 14 near the valve inlet designed to scoop a certain amount of fluid from the inlet. This elbow 32 is connected through the tubular pipe or connection 33 to the valve 34. In the form illustrated the valve 34 is a metering valve or needle valve designed to meter the flow of fluid through the connection 33. The valve 34 is shown as including a meter valve stem 35 operated by a suitable knob or operating wheel 36. The pointed section 37 of the valve stem 35 acts to meter the flow of fluid into the tubular connection 39.

The connection 39 is secured to one end of the ejector which is designated in general by the numeral 40. The ejector 40 in the form illustrated comprises a T-shaped body 41 including an inlet end 42, an outlet end 43, and a mixing chamber connecting end 44. A threaded nipple 45 is shown as extending into the inlet end 42, and an inlet nozzle 46 is engaged within the inner end of the nipple 45. This inlet nozzle 46 is provided with a tapering passage 47 therethrough so as to restrict the liquid so that it must flow through a relatively small orifice at a relatively high rate of speed. This changes some of the pressure energy of the fluid to velocity pressure with a resulting efficiency of energy transformation. A lowering of pressure in the mixing chamber results. An outlet nipple 49 is provided in the end 43 of the T-shaped body 41 and an outlet nozzle 50 is engaged within this nipple 49. The outlet nozzle 50 is preferably provided with an outwardly tapering passage 51 therethrough, this passage 51 being preferably of greater diameter at its inlet orifice than the diameter of the outlet end of the inlet nozzle 46. As a result when the connection through the outlet nozzle 50 is open the fluid may flow from the inlet nozzle out through the outlet nozzle causing a low pressure or partial vacuum in the mixing chamber 52 within the body 41.

A tubular pipe or connection 53 is provided between the mixing chamber connection 44 and the cover 29 of the valve, this tubular connection 53 bringing into communication the mixing chamber 52 of the ejector and the chamber 31 above the diaphragm. Thus a reduction in pressure within the mixing chamber 52 will cause a corresponding reduction in pressure in the chamber 31.

A tubular pipe or connection 54 connects the nipple 49 with the valve 55. This valve 55 operates as a pilot valve to control the operation of the main valve in a manner which will be hereinafter set forth in detail. The valve 55 may be of any suitable type and may constitute a hand operated valve or electrically operable valve such as a solenoid valve.

The valve 55 is connected by the pipe or conduit 56 to the metering valve 57. This valve 57 includes a T-shaped casing 59 enclosing a valve stem 60 having a pointed end 61. By rotation of the knob 62 the stem 60 may be rotated to move the pointed end 61 nearer to or farther from its seat, thus regulating the flow of fluid through this valve 57. The valve body 57 is also connected by a tubular connection 63 to an outlet elbow 64 which is preferably turned in the direction of flow of the liquid. Thus the flow of liquid through the outlet 11 of the main valve will tend to draw liquid from the elbow 64 and the pipe or connection 63.

In the operation of the valve A we may assume that the main valve is open, the valve disc or ring 16 being spaced from its seat 13. At such a time, the valve 55 is open. Assuming now that the valve 55 is closed, it will be seen that the liquid traveling through the elbow 32, the connection 33, the valve 34, the connection 39, the inlet nozzle 46 and the connection 53 will build up pressure within the chamber 31 tending to close the main valve. The inlet pressure will be built up throughout the entire area of the upper surface of the diaphragm 19 so that the valve will close. A portion of the undersurface of this diaphragm is subjected only to exhaust pressure or to back pressure of the fluid passing through the outlet 11.

When it is desired to open the main valve the pilot valve 55 is opened, allowing the fluid to flow through both nozzles of the ejector 40. A low pressure or partial vacuum is created in the mixing chamber 52 and thus in the pressure chamber 31 so that the fluid pressure on the lower side of the valve will open this valve. It should be noted that the diaphragm will open not only by the fluid pressure, but also by the reduction in pressure within the pressure chamber 31.

The metering valves 34 and 57 act to regulate the speed with which the main valve is opened or closed. As the flow through the ejector is decreased by partially closing the valve 34 the speed with which the main valve is closed may be decreased. Similarly by partially closing the valve 57 the speed with which liquid may be drawn from the chamber 31 is decreased, thus slowing down the opening action of the main valve.

The valve B includes a valve body 65 comprising a tubular conduit having ends 66 and 67. Either of these ends may comprise the inlet end while the other end serves as the outlet end of the device. Intermediate the ends 66 and 67 I provide a ported partition 69, which includes a valve seat 70 which may be engaged by a valve member 71. The valve member 71 is shown provided with a valve disc or sealing element 72 designed to engage the valve seat 70, and guides 73 are provided on the lower surface of the valve member. In order to guide the valve member into engagement with its seat, a valve stem 74, having a head 75 extends through a diaphragm washer 76, a diaphragm 77, and the valve member 71. A lock nut or other fastening means 79 holds the above listed elements in assembled relation. The valve stem 74 may extend into a bearing or aperture 80 within a boss 81 of the valve body 65 so that the valve stem may act as a guide for the valve member. A passage 82 communicates between the lower end of the aperture 80 and the interior of the valve so as to relieve unequal pressure surrounding the valve stem.

A cover 83 is mounted upon the valve body 65, this cover being held in place by cap screws or other means not shown in the drawings. The cover 83 is provided with a central upwardly extending body portion 84 designed to support certain valves and passages as will now be described. An elbow 85 may be threaded into the valve body 65 near the end 66. A passage 86 communicates with the passage through the elbow 85 and extends vertically in the body portion 84. A needle valve or metering valve 87 is provided with a threaded portion 89 adjustably mounted in the body portion 84 and the pointed end 90 of the valve 87 regulates the flow of fluid through the passage 86. An adjusting knob 91 is provided to permit adjustment in the position of the valve 87.

An elbow 92 may be threaded into the valve body 65 adjacent the end 67 thereof. A passage 93 extends upwardly through the body portion 84 in communication with the opening through the elbow 92. A needle valve 94 is threaded into the body portion 84 and the pointed end 95 thereof is designed to regulate the flow through the passage 93. An adjusting knob 96 is provided on the valve 94 to permit adjustment thereof.

A transverse passage extends through the body portion 84 connecting the passages 86 and 93. This transverse passage includes a small diameter end portion 97, a slightly larger diameter portion 99, and a still larger diameter portion 100. The portion 99 is designed to accommodate the ejector nozzle 101 having a tapering passage therethrough which tapers from substantially the diameter of the passage 97 to a relatively small diameter. The larger diameter portion 100 of the passage is designed to accommodate the ejector nozzle 102 and the sleeve 103. The nozzle portion 102 has a tapered opening therethrough identical in shape to the opening through the nozzle 101, and the sleeve 103 is provided to bush the passage 100 down to the size of the passage 97 so that the structure is identical on both ends. Plugs 104 and 105 close the ends of the transverse passage.

Valves 106 and 107 of any suitable type are provided in the passage 97 and in the passage through the sleeve 103, respectively. In the form shown the valves 106 and 107 are provided with tapered plungers 109 and 110 which may entirely close the transverse passage on either side of the ejector or may entirely open this passage. Only one of these valves is necessary for operation of the ejector in one direction, but if it is desired that the valve be reversible for operation by a flow of fluid in either direction two valves as shown are preferable.

A by-pass 68 connects the large diameter end of the ejector nozzle 101 with the passage 97 in order to circumvent the valve 106. A similar by-pass 78 connects the large diameter end of the ejector nozzle 102 with the passage through the sleeve 103 in order to circumvent the valve 107. Check valves 88 and 98 are provided in the by-passes 68 and 78 respectively. These check valves permit a flow of fluid from the inlet of the valve to the ejector, regardless of the direction of flow of the liquid through the valve. These check valves 88 and 98 will not, however, permit a flow of fluid from the ejector unless the pilot valves controlling the discharge from the ejector are open. The suction chamber 112 of the ejector between the nozzles 101 and 102 is connected by a passage 111 to a pressure chamber 113 above the diaphragm 77.

In operation the fluid may enter the inlet end 66 and exert pressure against the central portion of the valve member 71 raising the diaphragm and allowing fluid to flow out of the end 67. In this event both of the valves 107 and 106 are open. However, if the valves 106 and 107 are closed fluid will flow through the elbow 85, the passage 86, the sleeve 103, the check valve 98, the passage 78, the nozzle 102, the chamber 112, the passage 111 and into the chamber 113 above the diaphragm 77. The chamber 113 fills with fluid under inlet pressure until the diaphragm 77 is forced downwardly to close the valve. The valve remains closed as long as the valves 106 and 107 are closed.

Upon opening the valves 106 and 107 fluid is allowed to flow through both ejector nozzles 101 and 102, causing a reduction in pressure in the mixing chamber 112 and transmitting this reduced pressure into the chamber 113. The pressure of the fluid at the inlet and the reduced pressure in the chamber 113 then raises the valve member 71, allowing fluid to flow through the end 67 of the valve. The time required to open and close the valve is regulated by the needle valves 87 and 94. A similar action takes place when the end 67 of the valve acts as the inlet. Both the valves 106 and 107 may always operate in unison, as fluid from the inlet may always flow to the ejector past one of the check valves 88 or 98. Thus the pilot valves 106 and 107 in combination with the check valves 88 and 98 control the operation of the main valve in such a way that the pressure chamber 113 holds the main valve closed if the higher inlet pressure is at the end 66 or at the end 67 and even when the inlet pressure changes from the end 66 to the end 67 and vice versa. By closing the valves 87 and 94 the location of the diaphragm can be fixed in any desired position. Then the valve is adjustable for variable pressure and capacity on its delivery side.

In accordance with the patent statutes, I have described the principles of construction and operation of my valves, and while I have endeavored to set forth the best embodiments thereof, and have shown various combinations of elements, I desire to have it understood that other combinations of these elements could be used, and that obvious changes may be made within the scope of the following claims without departing from the spirit of my invention.

I claim:

1. A valve comprising a valve body through which fluid may flow, a valve seat between the ends of said body, a valve member engageable against said seat and having one side only thereof exposed to the static and dynamic forces of said fluid flow, a pressure chamber to which the other side of said valve member is exposed for controlling the movement of said valve member, an ejector connected to said pressure chamber to control the pressure therein, a pilot valve on each side of said ejector, a by-pass around each said pilot valve, and a check valve in each said by-pass.

2. A valve structure including a valve body having a passage through which fluid may flow, a valve member movable in said body operable to close the passage therethrough and having one side only thereof exposed to the static and dynamic forces of said fluid flow, a pressure chamber to which the other side of said valve member is exposed controlling the movement of said valve member, and an ejector connected in parallel with said valve passage and operable by the flow of fluid in either direction connected to said pressure chamber to control the pressure therein.

3. A valve structure including a valve body having a passage through which fluid may flow, a valve member movable in said body operable to close the passage therethrough and having one side only thereof exposed to the static and dynamic forces of said fluid flow, a pressure chamber to which the other side of said valve member is exposed controlling the movement of said valve member, an ejector connected in parallel with said valve passage and operable by the flow of fluid in either direction connected to said pressure chamber to control the pressure therein, and pilot valve means in series with said ejector controlling the flow of fluid to and from said ejector.

HERMAN E. SHEETS.

REFERENCES CITED

The following references are of record in the file of this patent:

UNITED STATES PATENTS

| Number | Name | Date |
|---|---|---|
| 1,814,206 | Donkin | July 14, 1931 |
| 2,291,731 | Lake | Aug. 16, 1940 |
| 2,137,874 | Goldberg | Nov. 22, 1938 |
| 1,885,367 | McKee | Nov. 1, 1932 |
| 608,454 | Gulland | Aug. 2, 1898 |
| 901,584 | Bowman | Oct. 20, 1908 |
| 2,000,297 | Putman | May 7, 1935 |
| 1,489,811 | Beggs | Apr. 8, 1924 |
| 1,302,538 | Gulick | May 6, 1919 |
| 570,727 | Gale | Nov. 3, 1896 |
| 971,934 | Siegrist | Oct. 4, 1910 |
| 2,235,304 | Toussaint | Mar. 18, 1941 |

FOREIGN PATENTS

| Number | Country | Date |
|---|---|---|
| 524,896 | British | Aug. 16, 1940 |
| 626,583 | German | Feb. 28, 1936 |
| 336,124 | French | 1904 |
| 21,543 | British | Nov. 8, 1894 |
| 590,737 | French | Mar. 25, 1925 |
| 8,319 | British | Apr. 26, 1894 |
| 339,086 | French | Oct. 31, 1904 |